(12) United States Patent
Andersson et al.

(10) Patent No.: US 10,325,134 B2
(45) Date of Patent: *Jun. 18, 2019

(54) METHOD AND SYSTEM FOR CALIBRATION OF AN OPTICAL FINGERPRINT SENSING DEVICE

(71) Applicant: Fingerprint Cards AB, Göteborg (SE)

(72) Inventors: Markus Andersson, Lomma (SE); Mikael Danielsson, Höllviken (SE); René Nilsson, Eslöv (SE); Hans Martinsson, Göteborg (SE)

(73) Assignee: Fingerprint Cards AB, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,029

(22) Filed: Oct. 12, 2018

(65) Prior Publication Data
US 2019/0050620 A1 Feb. 14, 2019

Related U.S. Application Data

(63) Continuation-in-part of application No. 15/661,680, filed on Jul. 27, 2017, now abandoned, and a
(Continued)

(30) Foreign Application Priority Data

Nov. 13, 2015 (SE) ..................................... 15514714

(51) Int. Cl.
*G06K 9/00* (2006.01)
*G06K 9/20* (2006.01)

(52) U.S. Cl.
CPC .......... *G06K 9/0002* (2013.01); *G06K 9/209* (2013.01)

(58) Field of Classification Search
None
See application file for complete search history.

(56) References Cited

U.S. PATENT DOCUMENTS 6,434,269 B1 * 8/2002 Hamburg .............. G06T 11/001
345/592
6,556,935 B2 * 4/2003 Morimura ............ G06K 9/0002
702/100
(Continued)

FOREIGN PATENT DOCUMENTS

JP 06223163 A * 8/1994

OTHER PUBLICATIONS

Fingerprint scroll wheel—mobiles, Biometric technology today 2003, p. 1 (Year: 2003).*
(Continued)

*Primary Examiner* — Jayesh A Patel
(74) *Attorney, Agent, or Firm* — RMCK Law Group, PLC

(57) ABSTRACT

A method of initiating a calibration operation of an optical fingerprint sensing device comprising an array of photosensitive elements for capturing a fingerprint pattern, the method comprising acquiring information indicative of a change of an environmental parameter influencing the operation of the fingerprint sensing device; and if the change is larger than a predetermined threshold value, performing a calibration operation of the fingerprint sensing device. There is also provided a fingerprint sensing device configured to perform the method, and a consumer electronic device comprising such a fingerprint sensing device.

21 Claims, 8 Drawing Sheets

Related U.S. Application Data continuation-in-part of application No. 15/661,736, filed on Jul. 27, 2017, now Pat. No. 10,108,840, which is a continuation of application No. 15/193,913, filed on Jun. 27, 2016, now abandoned.

(56) References Cited

U.S. PATENT DOCUMENTS

| | | | | |
|---|---|---|---|---|
| 6,593,916 B1* | | 7/2003 | Aroyan | G06F 3/045 345/173 |
| 8,278,946 B2 | | 10/2012 | Thompson et al. | |
| 8,618,818 B2* | | 12/2013 | Otagaki | G06F 3/044 324/679 |
| 8,736,432 B2* | | 5/2014 | Sitarski | B60K 35/00 340/407.2 |
| 8,773,146 B1* | | 7/2014 | Hills | G01N 27/22 324/658 |
| 8,938,101 B2* | | 1/2015 | Uy | G06F 3/0488 382/124 |
| 9,207,805 B2* | | 12/2015 | Kimura | G06F 3/0418 |
| 9,230,150 B1 | | 1/2016 | Merrell et al. | |
| 9,270,319 B2 | | 2/2016 | Bietz et al. | |
| 9,285,932 B1* | | 3/2016 | Wavomba | G06F 3/0418 |
| 9,576,176 B2* | | 2/2017 | Gozzini | G06K 9/0002 |
| 9,582,111 B2* | | 2/2017 | Rouaissia | G06F 3/0418 |
| 9,589,171 B1 | | 3/2017 | Larsson et al. | |
| 10,108,840 B2* | | 10/2018 | Andersson | G06K 9/0002 |
| 2002/0196066 A1 | | 12/2002 | Krah et al. | |
| 2003/0126448 A1* | | 7/2003 | Russo | G06K 9/00026 713/186 |
| 2003/0210259 A1* | | 11/2003 | Liu | G06F 3/016 715/702 |
| 2005/0220329 A1* | | 10/2005 | Payne | G06K 9/00013 382/124 |
| 2006/0060802 A1* | | 3/2006 | Richter | G06K 9/00046 250/556 |
| 2006/0176660 A1* | | 8/2006 | Amiri | G06F 1/1615 361/679.09 |
| 2008/0047764 A1* | | 2/2008 | Lee | G08C 21/00 178/18.06 |
| 2008/0192014 A1* | | 8/2008 | Kent | B82Y 10/00 345/173 |
| 2008/0246548 A1* | | 10/2008 | Fagg | H03B 5/06 331/132 |
| 2009/0089053 A1 | | 4/2009 | Wang et al. | |
| 2009/0267922 A1* | | 10/2009 | Umeda | H03K 17/962 345/178 |
| 2009/0289914 A1 | | 11/2009 | Cho | |
| 2010/0053090 A1* | | 3/2010 | Hong | G06F 3/0416 345/173 |
| 2010/0060590 A1* | | 3/2010 | Wilson | G06F 3/0418 345/173 |
| 2010/0123677 A1 | | 5/2010 | Brown et al. | |
| 2010/0258361 A1* | | 10/2010 | Yamauchi | G06F 3/044 178/18.06 |
| 2011/0009090 A1 | | 1/2011 | Sparks | |
| 2011/0043489 A1* | | 2/2011 | Yoshimoto | G06F 3/0416 345/175 |
| 2011/0115604 A1* | | 5/2011 | Sobel | G06F 21/32 340/5.52 |
| 2011/0118026 A1 | | 5/2011 | Lukas et al. | |
| 2011/0134069 A1* | | 6/2011 | Shen | G06F 3/0418 345/174 |
| 2011/0167357 A1* | | 7/2011 | Benjamin | H04L 12/1818 715/753 |
| 2011/0175703 A1 | | 7/2011 | Benkley | |
| 2011/0221694 A1* | | 9/2011 | Karaoguz | G06F 3/016 345/173 |
| 2011/0275408 A1 | | 11/2011 | Kulik | |
| 2011/0298482 A1* | | 12/2011 | Tokudome | H03K 17/962 324/686 |
| 2012/0050229 A1* | | 3/2012 | Tenuta | G06F 3/0418 345/178 |
| 2012/0218231 A1* | | 8/2012 | Slaby | G06F 3/0418 345/178 |
| 2012/0268411 A1* | | 10/2012 | Chen | G06F 3/0416 345/174 |
| 2012/0274598 A1* | | 11/2012 | Uy | G06F 3/0488 345/174 |
| 2012/0313767 A1* | | 12/2012 | Sitarski | B60K 35/00 340/425.5 |
| 2013/0316310 A1 | | 11/2013 | Musicant et al. | |
| 2014/0091817 A1* | | 4/2014 | Besshi | G06F 3/0418 324/684 |
| 2015/0071502 A1* | | 3/2015 | Breznicky | G06K 9/00885 382/115 |
| 2015/0234454 A1 | | 8/2015 | Kurz | |
| 2015/0277539 A1* | | 10/2015 | Chueh | G06F 1/3262 345/178 |
| 2016/0055825 A1* | | 2/2016 | Lee | G01J 1/0219 345/207 |
| 2016/0070404 A1* | | 3/2016 | Kerr | G06F 3/0418 345/174 |
| 2016/0088241 A1* | | 3/2016 | Sung | G06T 7/20 382/117 |
| 2016/0092717 A1* | | 3/2016 | Ling | G06K 9/0004 382/125 |
| 2017/0045918 A1* | | 2/2017 | Han | G06F 1/1684 |
| 2017/0060288 A1* | | 3/2017 | Subramanian | G06F 3/044 |
| 2017/0220838 A1* | | 8/2017 | He | G06K 9/0004 |
| 2017/0270342 A1* | | 9/2017 | He | G06F 3/0412 |
| 2017/0300736 A1* | | 10/2017 | Song | G06K 9/00033 |
| 2017/0364763 A1* | | 12/2017 | Jin | G06K 9/0002 |
| 2017/0372114 A1* | | 12/2017 | Cho | G01J 1/0219 |
| 2018/0005605 A1* | | 1/2018 | Kolli | G09G 5/363 |
| 2018/0074643 A1* | | 3/2018 | Tushar Balasaheb | G06F 3/0412 |
| 2018/0121703 A1* | | 5/2018 | Jung | G06K 9/0004 |
| 2018/0129798 A1* | | 5/2018 | He | G06K 9/00013 |
| 2018/0129853 A1* | | 5/2018 | Lee | G06F 3/04842 |

OTHER PUBLICATIONS

Fingerprint Scroll Wheel—Mobiles, Biometric Technology Today 2003, 1 Page.

\* cited by examiner

METHOD AND SYSTEM FOR CALIBRATION OF AN OPTICAL FINGERPRINT SENSING DEVICE

CROSS REFERENCE TO RELATED APPLICATIONS

This application is a Continuation-In-Part of U.S. application Ser. Nos. 15/661,736 and 15/661,680, filed on Jul. 27, 2017, which are Continuations of U.S. application Ser. No. 15/193,913, filed on Jun. 27, 2016, which claims the benefit of Swedish Patent Application No. 1551471-4 filed Nov. 13, 2015. The disclosures of the above applications are incorporated herein by reference in their entirety.

FIELD OF THE INVENTION

The present invention relates to calibration of an optical fingerprint sensor. In particular, the present invention relates to a method for determining when to initiate a calibration of an optical fingerprint sensor comprised in an electronic device.

BACKGROUND OF THE INVENTION

Various types of biometric systems are used more and more in order to provide for increased security and/or enhanced user convenience. In particular, fingerprint sensing systems have been adopted in, for example, consumer electronic devices, thanks to their small form factor, high performance, and user acceptance.

Among the various available fingerprint sensing principles (such as capacitive, optical, thermal etc.), optical sensing is increasing interest.

The optical properties of a fingerprint sensing device may depend on external factors such as temperature. Moreover, the humidity is also important for an optical sensor, since it relates to the optical contact of the finger with the optical interface such as a display surface and determines image features like finger coverage and image contrast. In particular, low humidity may lead to an absence of moist between the finger and the sensor which can make a significant difference in image capture since dry fingers are more difficult for the optical sensor than sweaty fingers. Finger dryness can for example be affected by weather conditions and individual human factors.

In order to compensate for variations depending on external factors, parameters of the sensing device can be calibrated towards the current conditions. For example, a calibration is often performed at system startup and thereafter repeated with given time intervals.

However, continuous calibration at given time intervals may lead to an unnecessarily high power consumption when the fingerprint sensor is unused for long periods of time. The power consumption may be decreased by increasing the time between calibrations. However, this is an undesirable approach since increasing the time between calibrations may lead to situations where the sensing device is being used just prior to a scheduled calibration event, increasing the risk that the fingerprint sensor is not properly calibrated for the current operating conditions.

SUMMARY

In view of above-mentioned desired properties of a fingerprint sensor, it is an object of the present invention to provide a method for determining when to perform a calibration operation ensuring a more accurate and power efficient operation of an optical fingerprint sensor.

According to an aspect of the invention, there is provided an optical fingerprint sensing device comprising an array of photosensitive elements configured to capture a fingerprint pattern, the device comprising at least one processor configured to: acquire information indicative of a change of an environmental parameter influencing the operation of the fingerprint sensing device; and if the change is larger than a predetermined threshold value, perform a calibration operation of the fingerprint sensing device, wherein the fingerprint sensing device further comprises a temperature sensor, a humidity sensor, and/or an electromagnetic field sensor, and wherein the environmental parameter is selected from the group comprising humidity, temperature and electrical field strength, wherein acquiring information indicative of a change of an environmental parameter comprises: determining a present value of the environmental parameter; determining a difference between the present value of the environmental parameter and a predetermined value of the environmental parameter; and if the difference is larger than the predetermined threshold value, performing the calibration operation of the fingerprint sensing device, and wherein the predetermined value of the environmental parameter is a value determined at a last performed calibration operation.

There is also provided a method of initiating a calibration operation of an optical fingerprint sensing device comprising an array of photosensitive elements configured to capture a fingerprint pattern, the method comprising: acquiring information indicative of a change of an environmental parameter influencing the operation of the fingerprint sensor; and if the change is larger than a predetermined threshold value, initiating a calibration operation of the fingerprint sensing device, wherein the environmental parameter is selected from the group comprising humidity, temperature and electrical field strength, wherein acquiring information indicative of a change of an environmental parameter comprises: determining a present value of the environmental parameter; determining a difference between the present value of the environmental parameter and a predetermined value of the environmental parameter; and if the difference is larger than the predetermined threshold value, performing the calibration operation of the fingerprint sensing device, and wherein the predetermined value of the environmental parameter is a value determined at a last performed calibration operation.

The fingerprint sensing device is an optical fingerprint sensor where a fingerprint image is acquired by capturing an image of a finger placed on the sensor surface. A fingerprint sensor arranged in an electronic device is typically calibrated at selected points in time to setup the fingerprint sensor for image capture under the current conditions.

The present invention is based on the realization that the calibration of the fingerprint sensor can be triggered to occur only when it is required, e.g. only when the external environment of the fingerprint sensor has changed to such a degree that it is unlikely that the latest performed calibration would provide an optimal, or satisfactory, fingerprint image. Accordingly, it is suggested to only initiate and perform a calibration of the fingerprint sensor only when an acquired parameter value exceeds a predetermined threshold value. The calibration functionality in itself can be assumed to be a known feature of the fingerprint sensing device. The present method is thus aimed at controlling when a calibration operation is initiated, i.e. when the command is given to perform one or more specific calibration operations. The calibration operations may comprise various known measures relating to the functionality of the sensor, and the specific calibration operations to perform will not be discussed in great detail.

The invention is further based on the realization that it may be sufficient to calibrate the fingerprint sensor when an event is detected that anticipates the use of the fingerprint sensor. Taking the example of a fingerprint sensor arranged in a user device such as a smartphone, there are typically long periods of inactivity of the smartphone when there is no need for the fingerprint sensor to be recently calibrated, and where regular calibrations would only lead to increased power consumption. Instead, the occurrence of a specific event may be used to initiate a calibration operation, thereby limiting the calibrations to when there is a high likelihood that the fingerprint sensor is about to be used. Information indicative of an event is thus received by the fingerprint sensing device, or by a control unit configured to control calibration of the fingerprint sensing device.

Through the inventive device and method, the power efficiency of a fingerprint sensing device can be improved since it is no longer required to perform calibrations at regular time intervals for the sensor to be capable of capturing a fingerprint image. Moreover, the reliability of the sensor is improved since the sensor is more likely to be calibrated according to current conditions when a fingerprint image is to be captured.

The step of acquiring information comprises determining a present value of an environmental parameter, determining a difference between the present value of the environmental parameter and a predetermined value of the environmental parameter, and if the difference is larger than the predetermined threshold value, performing the calibration operation of the fingerprint sensor. Determining a present value may comprise controlling a sensor connected to the fingerprint sensor to measure a parameter value, and to compare the current value with a predetermined value.

The predetermined value of the environmental parameter is a value determined at the last performed calibration operation. The predetermined value may also be an average value based on a number of earlier values. The predetermined value may also represent one or more predetermined parameter value ranges, such that when the current value is within a particular predetermined range, a calibration of the fingerprint sensor is performed.

The environmental parameter is selected from the group comprising humidity, temperature and electrical field strength, all of which may influence the operation of a fingerprint sensor. Various components of an optical system can be assumed to be affected by a change in temperature, which in turn results in a change in the captured fingerprint image. Accordingly, it is important to calibrate the sensing device at a temperature which is as close as possible to the temperature when a fingerprint is to be captured.

According to one embodiment of the invention, determining a present value of an environmental parameter may comprise acquiring information from a sensor integrated in the fingerprint sensor. The fingerprint sensor may comprise dedicated sensors for determining an environmental parameter. It may also be possible to determine a value of an environmental parameter, such as electric field, by using components already present in the fingerprint sensor.

According to one embodiment of the invention, determining a present value of an environmental parameter may comprise acquiring information from a sensor external to the fingerprint sensor. The fingerprint sensor device is typically integrated in a consumer electronics device, which in itself may comprise one or more sensors for determining parameters such as temperature, humidity and electromagnetic field. Thereby, the fingerprint sensor may request information for such external sensors.

Furthermore, determining a present value of an environmental parameter may comprises acquiring information via a network connection. The fingerprint sensor device may be integrated in a device having a network connection, such as a WiFi, Bluetooth or cellular data connection. This means that the device may communication with remote devices or with internet services to acquire relevant environmental information. To be relevant, the acquired information is preferably based on the location of the device, and the location may be determined using a GPS integrated in the device or by means of location identification via the network connection.

According to one embodiment of the invention, the method may further comprise performing a second calibration operation of the fingerprint sensor a predetermined time after a first operation has been performed resulting from the change in environmental parameter. It may be desirable to perform a second calibration after a certain time, when the sensor has fingerprint sensor has reached has stabilized after the detected change. For example, if a temperature change is detected, triggering a calibration operation, it may be some delay before all components of the sensor has reached the new temperature. Therefore, it is advantageous to perform a second calibration at a time when it is estimated that a stable state of the sensor is reached.

According to one embodiment of the invention, the group of predetermined events may comprise events requiring a user interaction with the device in which the fingerprint sensor is arranged. Such events may for example comprise an incoming call, an alarm, an incoming message and an incoming notification, where the user is prompted to use the device. Thereby, when such an event is detected, a calibration operation can be initiated and performed before the user has time to reach the sensor since a calibration operation can be performed in a very short time compared to the time it takes for a user to react to an event. Thus, the fingerprint sensor can be calibrated just prior to being used. To perform the required calibration operation may take in the range 1-2 seconds. However, the time for performing the calibration operating may vary depending on the hardware used on the type of calibration to be performed. Moreover, it may be desirable to perform different types of calibration operations for different types of events, or for different changes in an environmental parameter.

According to one embodiment of the invention, the event may comprise a change in a network connection. The change in network connection may for example be a change in cell ID in a cellular network, a change in WiFi node connection, a change in a Bluetooth connection or the like. Furthermore, the event may comprise a change in location. The change in location may be detected for example as a change in network connection, where the change from one WiFi node to another can be used as an indicator of a change in location. Changing location may in turn indicate that the external environment changes, such as if a user is moving from indoors to outdoors, which may require a calibration of the fingerprint sensor.

According to one embodiment of the invention, the event may comprise the connection of a charger to the device in which the fingerprint sensing device is arranged. When a charger is connected to the device, the supply voltage may change, and in particular the drive voltage $V_{DD}$ of the fingerprint sensor, which in turn influences the operation of the sensor. Thereby, it may be desirable to perform a calibration when a charger is connecter. Furthermore, a charger may introduce noise into the device, and into the fingerprint sensor, such that a calibration is required to properly capture a fingerprint despite any induced noise.

According to one embodiment of the invention, the method may further comprise waiting for a minimum period of time between consecutive calibration operations. There may be situations where a device receives a large number of notifications, or when other types of events occur, during a short period time, in which case it is not desirable that a calibration operation of the sensor is performed after every event. Thereby, a minimum time between calibrations can be set to both to ensure that the sensor is not occupied with calibration operations when it is to be used, and to reduce the power consumption of the sensor.

According to one embodiment of the invention, wherein the fingerprint sensing device further comprises at least one optical lens, the method may further comprise, for a calibration operation initiated by a determined change in environmental parameter, adapting the captured fingerprint pattern based on an estimated change in properties of an optical path from the finger to the image sensor resulting from the detected change in environmental parameter. A change in e.g. temperature may change the optical properties of the fingerprint sensing device in that components of the device may move due to thermal expansion. Thereby, the optical path between the sensing surface and the image sensor may be different for different temperatures, thereby making it desirable to calibrate the sensing device if a change in temperature is detected.

A change in temperature may for example result in a change in location of a focal point of the lens or a change of an object distance. Moreover, an increased temperature may lead to increased noise in electrical components of the fingerprint sensing device.

According to one embodiment of the invention wherein the fingerprint sensing device is arranged underneath a display panel and configured to capture an image of a finger in contact with an outer surface of the display panel, the method may further comprise, for a calibration operation initiated by a determined change in temperature, determine a change in optical properties of the optical system comprising the display panel and the fingerprint sensing device resulting from the detected change in environmental parameter. Thereby, also changing properties of the display panel resulting from a change in temperature may be taken into account. A change in temperature may for example result in a change in position of a display pattern.

Additional effects and features of the second aspect of the invention are largely analogous to those described above in connection with the first aspect of the invention.

There is also provided an electronic consumer device comprising a display panel and an optical fingerprint arranged underneath the display panel and configured to capture an image of a finger in contact with an outer surface of the display panel, the optical fingerprint sensing device comprising an array of photosensitive elements configured to capture a fingerprint pattern, said device comprising at least one processor configured to: acquire information indicative of a change of an environmental parameter influencing the operation of said fingerprint sensing device; and if said change is larger than a predetermined threshold value, perform a calibration operation of said fingerprint sensing device, wherein said fingerprint sensing device or said electronic consumer device further comprises a temperature sensor, a humidity sensor, and/or an electromagnetic field sensor, and wherein said environmental parameter is selected from the group comprising humidity, temperature and electrical field strength, wherein acquiring information indicative of a change of an environmental parameter comprises: determining a present value of the environmental parameter; determining a difference between said present value of said environmental parameter and a predetermined value of said environmental parameter; and if said difference is larger than said predetermined threshold value, performing said calibration operation of said fingerprint sensing device, and wherein said predetermined value of said environmental parameter is a value determined at a last performed calibration operation.

The electric consumer device may for example be a smartphone, a tablet computer, a laptop and the like.

Furthermore, the fingerprint sensing device may comprise a temperature sensor, a humidity sensor, and/or an electromagnetic field sensor. The fingerprint sensing device may also be arranged in a user device, such as a smartphone, where the above described sensors are integrated in the smartphone and communicatively coupled to the calibration control unit of the fingerprint sensing device.

Effects and features of the third aspect of the invention are largely analogous to those described above in connection with the first and second aspects of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the method and device according to embodiments of the present invention are mainly described with reference to an optical fingerprint sensing device arranged in a handheld user device, such as a smartphone. However, the method is applicable also for other types of fingerprint sensing devices, and for fingerprint sensing device arranged in other types of consumer electronic devices.

Figure 1:
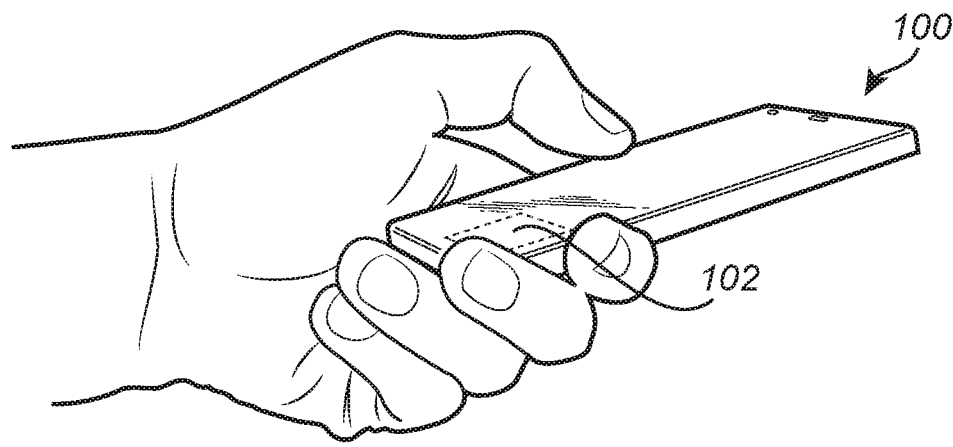
FIG. 1 schematically illustrates a smartphone comprising a fingerprint sensing device.

FIG. 1 schematically illustrates an application for a fingerprint sensing device 102 according to an example embodiment of the present invention, in the form of a smartphone 100 with an integrated fingerprint sensing device 102. The fingerprint sensing device 102 may, for example, be used for unlocking the smartphone 100 and/or for authorizing transactions carried out using the smartphone 100, etc. A fingerprint sensing device 102 according to various embodiments of the invention may also be used in other devices, such as tablet computers, laptops, smartcards or other types of consumer electronics.

Figure 2A:
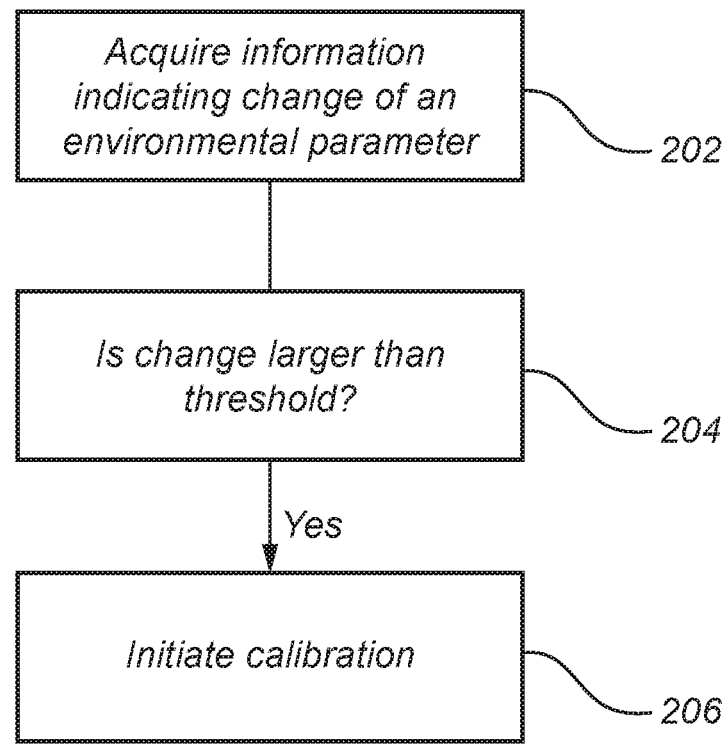
FIG. 2 is a flow chart outlining the general steps of a method according of an embodiment of the invention.
Figure 3:
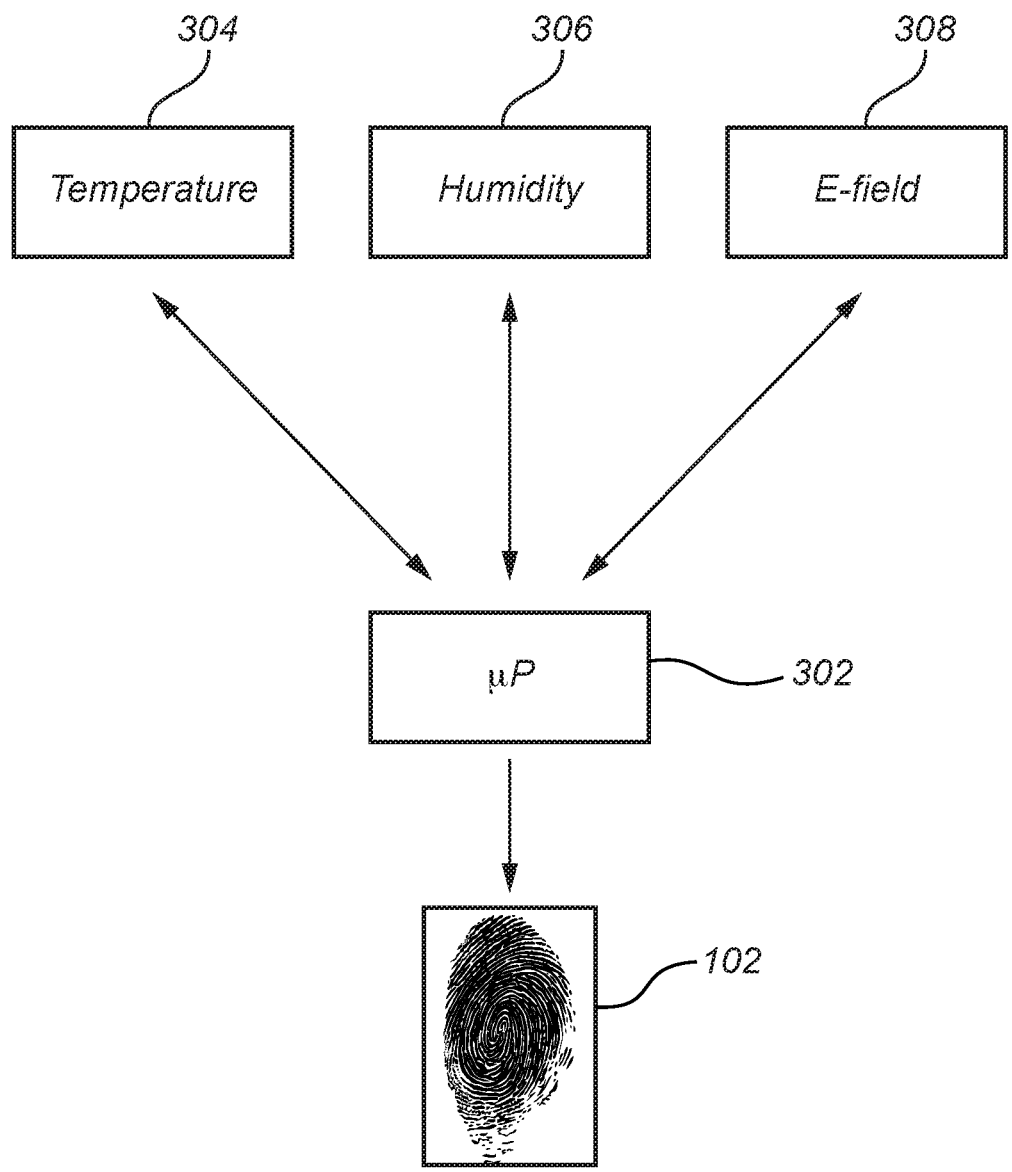
FIG. 3 is a schematic illustration of a device comprising a fingerprint sensing device according to an embodiment of the invention.

FIG. 2a is a flow chart outlining the general steps of a method according to an embodiment of the invention, with reference to the block diagram of FIG. 3 illustrating features of a fingerprint sensing device and of a smartphone in which the sensing device is arranged. First, the method comprises acquiring 202 information indicative of a change of an environmental parameter influencing the operation of the fingerprint sensor. The acquisition of information can be initiated by a request from a calibration control unit 302 of the fingerprint sensing device 102. Alternatively, or in combination, information indicative of a change of an environmental parameter may also be provided to the control unit 302 of the fingerprint sensing device 102 from the smartphone 100, without a specific request from the control unit 302. The control unit 302 is illustrated herein in the form of a microprocessor, connected to the fingerprint sensing device 102, the control unit 302 being configured to control at least the initiation of a calibration operation of the fingerprint sensing device 102. The control unit 302 may also be configured to control all functionality of the fingerprint sensing device 102. Moreover, the control unit 302 may be a general purpose control unit of the smartphone 100, also configured to control the fingerprint sensing device 102.

Next, the change in parameter value is compared 204 to a predetermined threshold value, and if the change is larger than the threshold value, a calibration operation the fingerprint sensor is initiated 206 and subsequently performed so that the fingerprint sensing device 102 is calibrated according to the current environmental conditions.

Figure 2B:
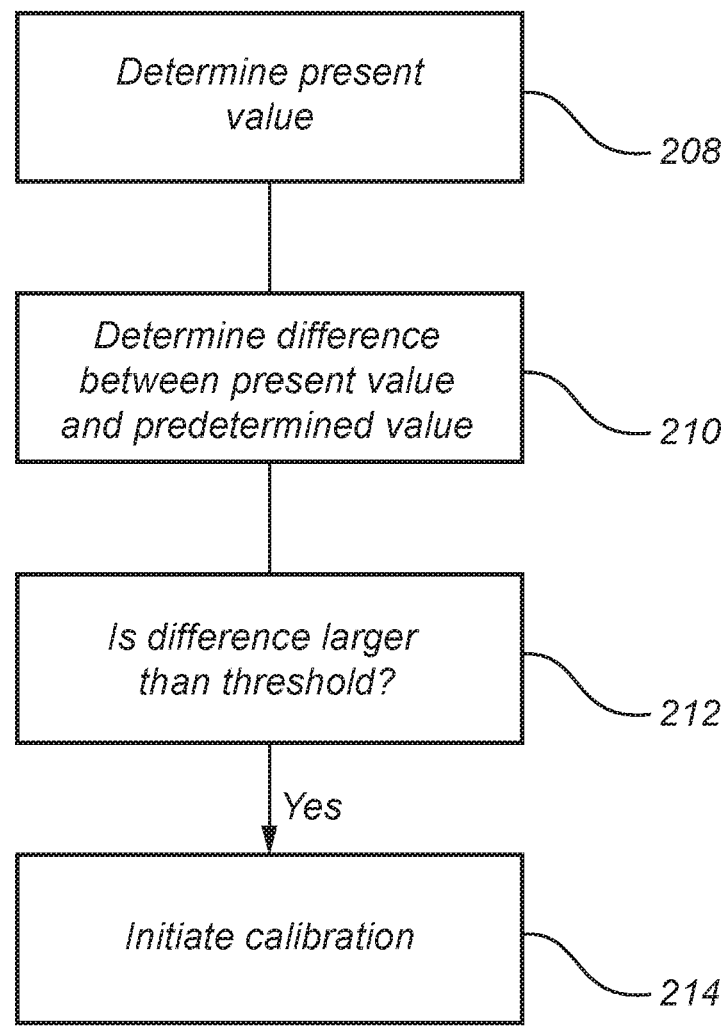

As illustrated in the flow chart of FIG. 2b, determining a change in an environmental parameter may comprise determining 208 a present value of an environmental parameter, determining 210 a difference between the present value of the environmental parameter and a predetermined value of the environmental parameter; and comparing 212 the difference with a predetermined threshold value, and if the difference is larger than the predetermined threshold value, initiating 214 and subsequently performing the calibration operation of the fingerprint sensor.

Accordingly, as illustrated in FIGS. 2a-b, the information indicative of change may either be provided directly as information from a source external to the control unit 302 and fingerprint sensor 102, or the change may be detected by a measurement and subsequent comparison initiated by the control unit 302 of the fingerprint sensor 102.

Parameters that may be calibrated during a calibration operation of the fingerprint sensor include, but are not limited to, a threshold for analogue finger detection, analogue gain before analog-to-digital (AD) conversion of a pixel value, and digital gain and shift in AD-conversion of a pixel value. In the case where the AD-conversion parameters are tuned for each image capture, the default settings or start values for tuning can be subject to calibration.

FIG. 3 further illustrates that the control unit is communicatively connected to a number of sensors for measuring environmental parameters. The sensors are here illustrated as a temperature sensor 304, a humidity sensor 306, and an electromagnetic field sensor 308. The environmental sensors may be integrated in the fingerprint sensing device circuitry, or they may be part of the smartphone 100 in which the fingerprint sensor 102 is arranged.

Figure 4:
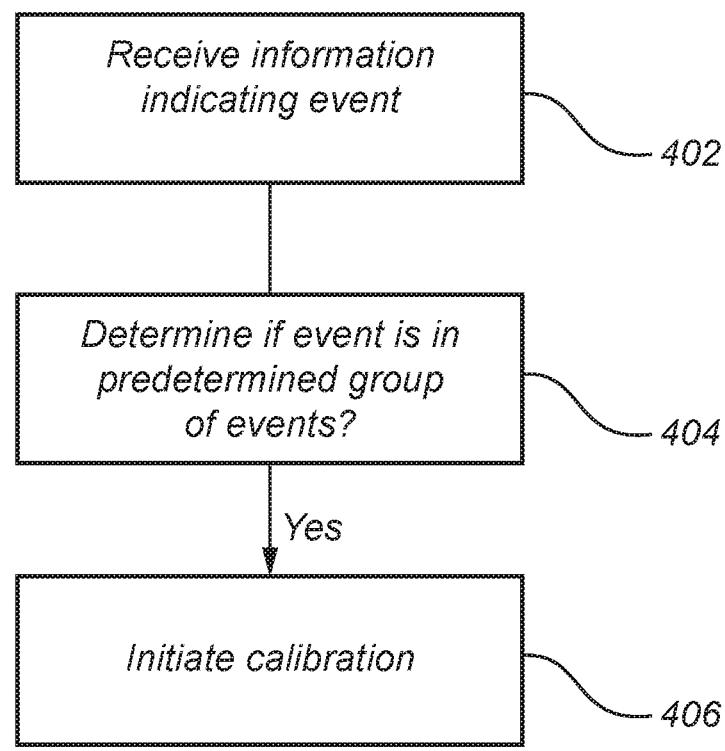
FIG. 4 is a flow chart outlining the general steps of a method according of an embodiment of the invention.

FIG. 4 is a flow chart outlining the general steps of a method according to an embodiment of the invention comprising receiving 402 information indicative of an event in a device 100 in which the fingerprint sensing device 102 is arranged, and determining 404 if the event is one of a group of predetermined events. If the event is among the group of predetermined events a calibration operation of the fingerprint sensor is initiated 406 and subsequently performed.

Figure 5:
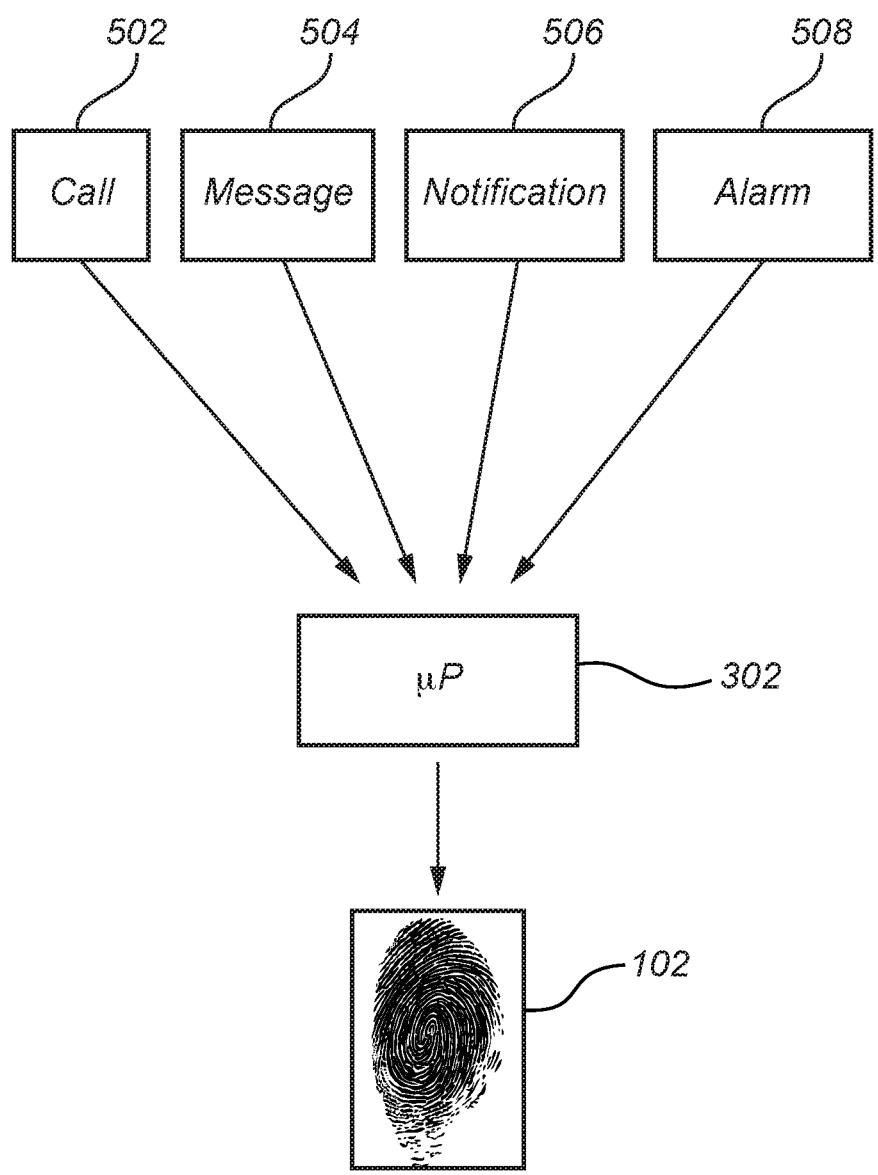
FIG. 5 is a schematic illustration of a device comprising a fingerprint sensing device according to an embodiment of the invention.

The group of predetermined events comprises events requiring a user interaction with the smartphone 100. As illustrated in FIG. 5, the group of events may comprise an incoming call 502, an alarm 504, an incoming message 506 and an incoming notification 508. All of the aforementioned events typically encourage a user to interact with the smartphone 100, possibly requiring the use of the fingerprint sensor 102 for unlocking the smartphone 100. Other types of events may also be comprised in the group of predetermined events. An example of such an event is the connection of the smartphone 100 to a charger, which may lead to a change in the drive voltage, $V_{DD}$, of the fingerprint sensing device, which in turn influences the operating characteristics of the device and thereby benefiting from a re-calibration of the fingerprint sensor. Other events triggering a calibration operation may be events relating to applications of the device, for example if an application is launched which can be anticipated to require fingerprint verification.

Figure 6:
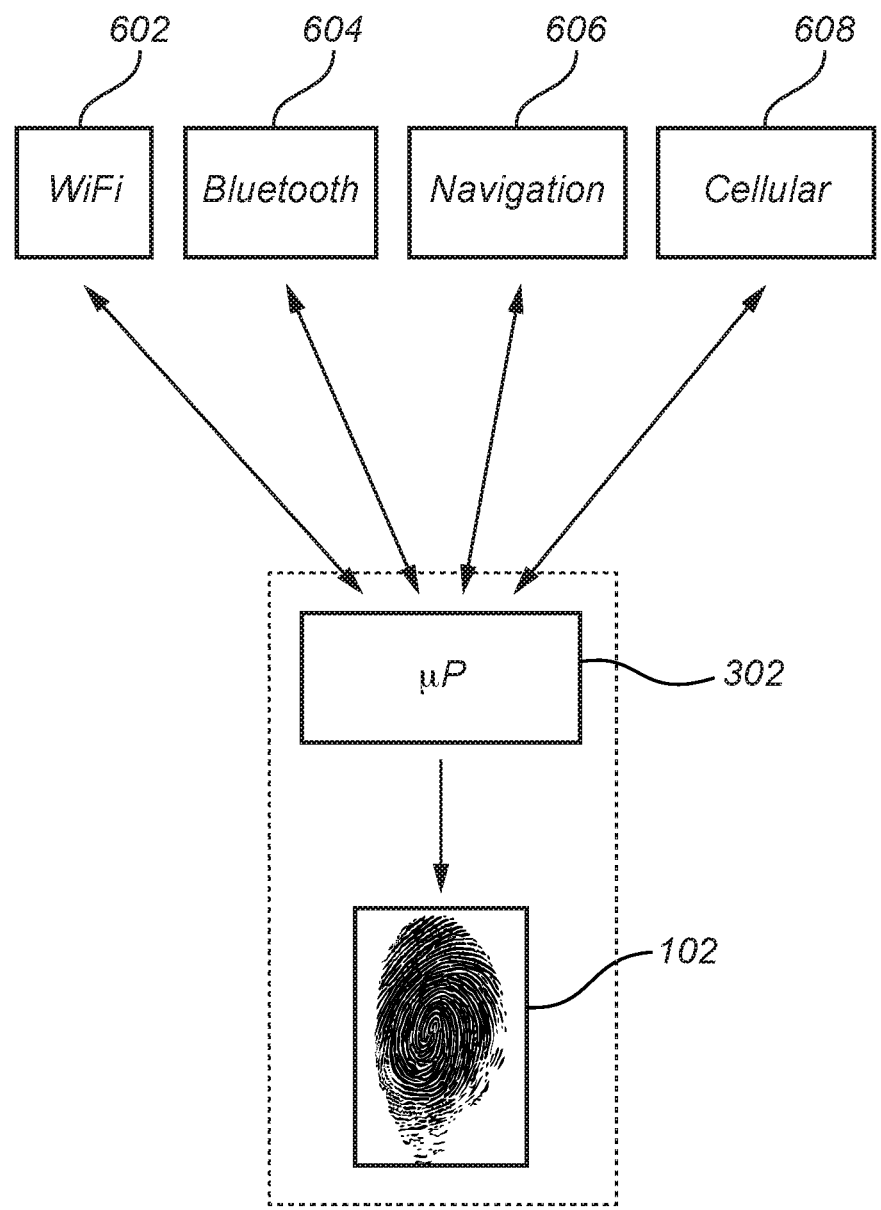
FIG. 6 is a schematic illustration of a device comprising a fingerprint sensing device according to an embodiment of the invention.

FIG. 6 schematically illustrates another group of events which may be comprised in the group of events initiating a calibration operation. FIG. 6 illustrates that the smartphone 100 in which the fingerprint sensor 102 and control unit 302 is arranged may comprise various additional functionality, such as WiFi 602, Bluetooth 604, Navigation 606 and cellular network 608 connection functionality. The described functionalities can all be used to indicate a change of location of the smartphone 100, which in turn may require a calibration of the smartphone 100. For example, a change in signal strength, or the loss of a WiFi connection may indicate that the user moves from indoors to outdoors, thereby suggesting a change in environmental conditions requiring a calibration operation. The same applies for a change in a Bluetooth connection or the change in a cellular network connection. Furthermore, a device is often wirelessly connected via two or more technologies, in which case the combination of changes in connection properties can be used to determine for example if the user moves from indoors to outdoors. Navigation functionality using systems such as GPS, Glonass or Galileo can also be used to determine a change of location of the smartphone 100 requiring a calibration of the fingerprint sensor 102.

Figure 7:
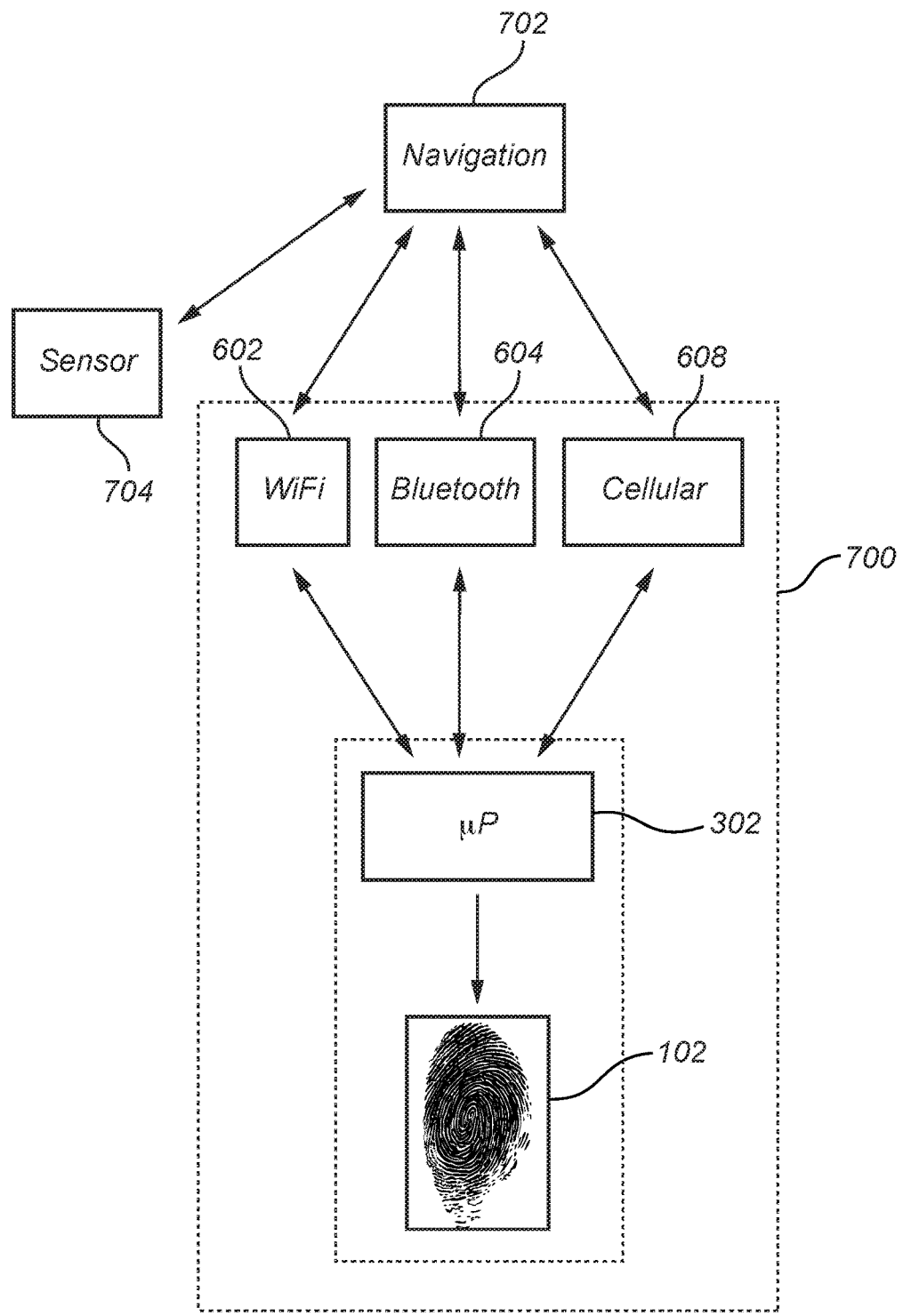
FIG. 7 is a schematic illustration of a system and a device comprising a fingerprint sensing device according to an embodiment of the invention.

FIG. 7 illustrates a user device 700 comprising at least one of a WiFi 602, Bluetooth 604 and a cellular network 608 connection and which is configured to connect to a remote service provider 702 to acquire information regarding an environmental parameter, a change in environmental parameter, and/or of an event which can be used to determine if a calibration operation should be initiated. The remote service may for example be an internet based service providing up-to-date local humidity and temperature information. The remote service may also be connected to specific sensors 704 located in the vicinity of the user device 700, which may be of any of the types discussed above. Moreover, the user device 700 may also use a peer-to-per connection to exchange relevant environmental information with nearby devices, thereby receiving relevant information indicative of a change in an environmental parameter. Thereby, a change in an environmental parameter may be detected even if neither of the fingerprint sensing device 102 or the user device 700 in which the sensor is arranged comprises any sensors.

Figure 8A:
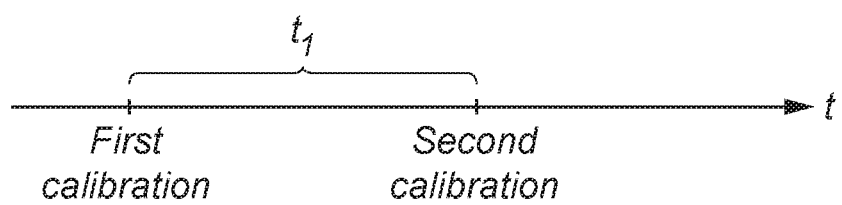
FIG. 8*a-b* are timelines schematically illustrating the method according to embodiments of the invention.
Figure 8B:
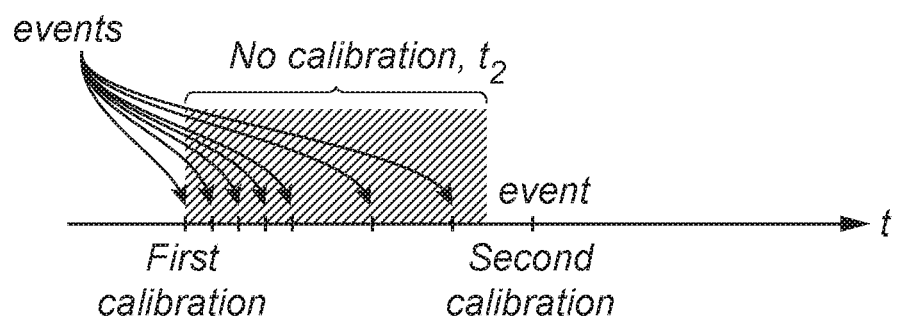

FIGS. 8a-b schematically illustrate timelines elaborating further steps of a method according to embodiments of the invention. FIG. 8a illustrates that a second calibration operation is performed a predetermined time $t_1$ after a first calibration operation has been performed, where the first calibration operation was initiated by a change in environmental parameter or by a specific event. If the change in environmental parameter triggering the first calibration is a rapid change in temperature, it may be advantageous to perform a second calibration once the properties of the fingerprint sensing device have stabilized to the new conditions. Taking the example that a change in temperature is detected where the temperatures changes from +20° C. to −10° C., indicating a movement from indoors to outdoors, a first calibration is advantageously initiated and performed to compensate for any change in humidity. After a certain time has elapsed, such as one or a few minutes, it can be assumed that the temperature of the surface and of the components in the sensing device has stabilized after which a second calibration is performed.

FIG. 8b illustrates the situation where a first calibration is initiated, for example based on an event such as a message notification, and where a number of subsequent event occur in rapid succession, and where the events normally would trigger new calibrations. To avoid performing many calibrations repeatedly in a short time interval, a time period $t_2$, starting after the first calibration is finalized, is set during which no calibration may be performed. It may also be possible to override the no calibration condition during $t_2$ is specific excluded events occur, such as a change in the temperature. Once $t_2$ has passed, the next event triggering a calibration can be handled normally and a calibration performed.

It is also easy to realize that a combination of the above described methods for initiating a calibration operation of a fingerprint sensing device may be used to an advantage. For example, if a calibration has been recently performed resulting from a change in an environmental parameter, it may not be required to perform a new calibration if an event from the group of events is detected.

Even though the invention has been described with reference to specific exemplifying embodiments thereof, many different alterations, modifications and the like will become apparent for those skilled in the art. Also, it should be noted that parts of the method may be omitted, interchanged or arranged in various ways, the method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical fingerprint sensing device comprising an array of photosensitive elements configured to capture a fingerprint pattern, said optical fingerprint sensing device comprising at least one processor configured to:
   acquire information indicative of a change of an environmental parameter influencing the operation of said optical fingerprint sensing device; and
   if said change is larger than a predetermined threshold value, perform a calibration operation of said optical fingerprint sensing device,
   wherein said optical fingerprint sensing device further comprises a temperature sensor, a humidity sensor, and/or an electromagnetic field sensor, and
   wherein said environmental parameter is selected from the group comprising humidity, temperature and electrical field strength,
   wherein acquiring information indicative of a change of an environmental parameter comprises:
   determining a present value of the environmental parameter;
   determining a difference between said present value of said environmental parameter and a predetermined value of said environmental parameter; and
   if said difference is larger than said predetermined threshold value, performing said calibration operation of said optical fingerprint sensing device, and
   wherein said predetermined value of said environmental parameter is a value determined at a last performed calibration operation.

2. The optical fingerprint sensor device according to claim 1, wherein determining a present value of an environmental parameter comprises acquiring information from at least one of the temperature sensor, the humidity sensor, and the electromagnetic field sensor.

3. The optical fingerprint sensor device according to claim 1, wherein determining a present value of an environmental parameter comprises acquiring information from a sensor external to said optical fingerprint sensing device.

4. The optical fingerprint sensor device according to claim 1, wherein determining a present value of an environmental parameter comprises acquiring information indicative of said environmental parameter via a network connection of an electronic device in which the optical fingerprint sensing device is arranged.

5. The optical fingerprint sensing device according to claim 1, wherein said information indicative of a change of an environmental parameter is acquired only when no finger is placed on the optical fingerprint sensing device.

6. The optical fingerprint sensing device according to claim 1, wherein the at least one processor is further configured to initiate a second calibration operation of said optical fingerprint sensing device a predetermined time after a first operation has been performed resulting from said change in environmental parameter.

7. The optical fingerprint sensing device according to claim 1, wherein the at least one processor is further configured to wait for a minimum period of time between consecutive calibration operations.

8. The optical fingerprint sensing device according to claim 1, further comprising an optical lens, and wherein a calibration operation initiated by a detected change in temperature comprises adapting a captured fingerprint pattern based on an estimated change in properties of an optical path from the finger to the image sensor resulting from the detected change in temperature.

9. A display panel comprising the optical fingerprint sensing device according to claim 1, wherein the optical fingerprint sensing device is arranged underneath the display panel and configured to capture an image of a finger in contact with an outer surface of the display panel.

10. A method of initiating a calibration operation of an optical fingerprint sensing device comprising an array of photosensitive elements configured to capture a fingerprint pattern, said method comprising:
  acquiring information indicative of a change of an environmental parameter influencing the operation of said optical fingerprint sensing device; and
  if said change is larger than a predetermined threshold value, initiating a calibration operation of said optical fingerprint sensing device,
  wherein said environmental parameter is selected from the group comprising humidity, temperature and electrical field strength,
  wherein acquiring information indicative of a change of an environmental parameter comprises:
  determining a present value of the environmental parameter;
  determining a difference between said present value of said environmental parameter and a predetermined value of said environmental parameter; and
  if said difference is larger than said predetermined threshold value, performing said calibration operation of said optical fingerprint sensing device, and
  wherein said predetermined value of said environmental parameter is a value determined at a last performed calibration operation.

11. The method according to claim 10, wherein determining a present value of an environmental parameter comprises acquiring information indicative of said environmental parameter from a sensor integrated in said optical fingerprint sensing device.

12. The method according to claim 10, wherein determining a present value of an environmental parameter comprises acquiring information indicative of said environmental parameter from a sensor external to said optical fingerprint sensing device.

13. The method according to claim 10, wherein the step of acquiring information indicative of a change of an environmental parameter is performed only when no finger is placed in contact with the optical fingerprint sensing device.

14. The method according to claim 10, wherein determining a present value of an environmental parameter comprises acquiring information indicative of said environmental parameter via a network connection of an electronic device in which the optical fingerprint sensing device is arranged.

15. The method according to claim 10, further comprising initiating a second calibration operation of said optical fingerprint sensing device a predetermined time after a first operation has been performed resulting from said change in environmental parameter.

16. The method according to claim 10, further comprising waiting for a minimum period of time between consecutive calibration operations.

17. The method according to claim 10, wherein the optical fingerprint sensing device further comprises an optical lens, and wherein the method further comprises, for a calibration operation initiated by a determined change in environmental parameter, adapting a captured fingerprint pattern based on an estimated change in properties of an optical path from the finger to the image sensor resulting from the detected change in environmental parameter.

18. The method according to claim 17, further comprising determining a change in location of a focal point of the optical lens as a result of the detected change in environmental parameter.

19. The method according to claim 10, wherein the optical fingerprint sensing device further comprises an optical lens, and wherein the method further comprises, for a calibration operation initiated by a determined change in temperature, adapting a captured fingerprint pattern based on an estimated change in properties of an optical path from the finger to the image sensor resulting from the detected change in temperature.

20. The method according to claim 10, wherein the optical fingerprint sensing device is arranged underneath a display panel and configured to capture an image of a finger in contact with an outer surface of the display panel, the method further comprising, for a calibration operation initiated by a determined change in temperature, determine a change in optical properties of an optical system comprising the display panel and the optical fingerprint sensing device resulting from the detected change in environmental parameter.

21. An electronic consumer device comprising a display panel and an optical fingerprint sensing device arranged underneath the display panel and configured to capture an image of a finger in contact with an outer surface of the display panel, the optical fingerprint sensing device comprising an array of photosensitive elements configured to capture a fingerprint pattern, said electronic consumer device comprising at least one processor configured to:
  acquire information indicative of a change of an environmental parameter influencing the operation of said optical fingerprint sensing device; and
  if said change is larger than a predetermined threshold value, perform a calibration operation of said optical fingerprint sensing device,
  wherein said optical fingerprint sensing device or said electronic consumer device further comprises a temperature sensor, a humidity sensor, and/or an electromagnetic field sensor, and
  wherein said environmental parameter is selected from the group comprising humidity, temperature and electrical field strength,
  wherein acquiring information indicative of a change of an environmental parameter comprises:
  determining a present value of the environmental parameter;
  determining a difference between said present value of said environmental parameter and a predetermined value of said environmental parameter; and
  if said difference is larger than said predetermined threshold value, performing said calibration operation of said optical fingerprint sensing device, and
  wherein said predetermined value of said environmental parameter is a value determined at a last performed calibration operation.

* * * * *